(12) United States Patent
Erickson et al.

(10) Patent No.: US 6,181,707 B1
(45) Date of Patent: Jan. 30, 2001

(54) INTERCOM SYSTEM HAVING UNIFIED CONTROL AND AUDIO DATA TRANSPORT

(75) Inventors: Timothy Lee Erickson, Walnut Creek; John Franklin Anthony Jurrius, Hercules; Lewis Clark McCoy, Pleasanton, all of CA (US)

(73) Assignee: Clear Com, Berkeley, CA (US)

( * ) Notice: Under 35 U.S.C. 154(b), the term of this patent shall be extended for 0 days.

(21) Appl. No.: 08/835,339

(22) Filed: Apr. 7, 1997

Related U.S. Application Data (60) Provisional application No. 60/042,965, filed on Apr. 4, 1997.

(51) Int. Cl.[7] ............................. H04B 7/212; H04M 1/00

(52) U.S. Cl. ............................................................ 370/442

(58) Field of Search ....................... 370/280, 294, 370/314, 321, 339, 349, 362, 413, 420, 442, 451, 458, 468, 489, 260, 364, 438, 439, 461, 475; 340/825.5, 825.52; 379/159, 160, 167

(56) References Cited

U.S. PATENT DOCUMENTS

| | | |
|---|---|---|
| 3,573,379 | 4/1971 | Schmitz et al. . |
| 3,924,077 * | 12/1975 | Blakeslee ............................. 370/433 |
| 3,935,396 | 1/1976 | Barsellotti et al. . |
| 3,941,936 | 3/1976 | Graham et al. . |
| 4,059,735 | 11/1977 | Betts . |
| 4,188,511 | 2/1980 | Smith et al. . |
| 4,292,475 | 9/1981 | Hill et al. . |
| 4,313,033 | 1/1982 | Walker et al. . |
| 4,359,603 | 11/1982 | Heaton . |
| 4,381,427 * | 4/1983 | Cheal et al. ......................... 370/216 |
| 4,382,295 | 5/1983 | Moffitt et al. . |
| 4,389,720 | 6/1983 | Baxter et al. . |
| 4,416,007 | 11/1983 | Huizinga et al. . |
| 4,499,578 | 2/1985 | Marouf et al. . |
| 4,518,821 | 5/1985 | Yuter . |
| 4,558,180 | 12/1985 | Scordo . |
| 4,606,021 | 8/1986 | Wurst . |
| 4,646,288 | 2/1987 | Shumway . |
| 4,648,108 | 3/1987 | Ellis et al. . |
| 4,658,398 | 4/1987 | Hsing . |
| 4,685,134 | 8/1987 | Wine . |
| 4,716,585 | 12/1987 | Tomkins et al. . |
| 4,726,016 | 2/1988 | Uchida et al. . |
| 4,730,306 | 3/1988 | Uchida . |
| 4,739,205 | 4/1988 | Fuhrman . |
| 4,740,955 * | 4/1988 | Litterer et al. ....................... 370/468 |
| 4,797,877 | 1/1989 | Pope et al. . |
| 4,809,262 | 2/1989 | Klose et al. . |
| 4,809,270 | 2/1989 | Baxter et al. . |
| 4,839,888 | 6/1989 | Baltz et al. . |
| 4,901,308 | 2/1990 | Deschaine . |

(List continued on next page.)

Primary Examiner—Chau Nguyen
Assistant Examiner—Chiho Andrew Lee
(74) Attorney, Agent, or Firm—Crosby, Heafey, Roach & May (57) ABSTRACT

An intercom system utilizing peer-to-peer computer network hardware that shares bandwidth between digital audio transport and inter-processor data communications on a common time-division-multiplexed (TDM) parallel bus. The system hardware automates symmetric, simultaneous, variable-length data block transfers among all of the microprocessor-controlled cards in the system. These cards communicate without intervention by or assistance from a central controller or intermediary communications processor, thereby improving system throughput and reliability and decreasing system complexity. An additional benefit of the communication scheme employed herein is that all system cards automatically track changes in the population of other cards in the system. The intercom system described employs a Configuration Card connected to a configuration computer to provides the system supervisor with the ability to quickly configure the system for a particular use without altering the system's hardware configuration.

22 Claims, 8 Drawing Sheets

U.S. PATENT DOCUMENTS

| | | | |
|---|---|---|---|
| 4,924,464 | * 5/1990 | Baylock | 370/535 |
| 4,947,440 | 8/1990 | Bateman et al. . | |
| 4,993,073 | 2/1991 | Sparkes . | |
| 5,027,347 | 6/1991 | Malkki . | |
| 5,072,442 | 12/1991 | Todd . | |
| 5,128,928 | 7/1992 | Wilder et al. . | |
| 5,136,585 | * 8/1992 | Nizamuddin et al. | 370/254 |
| 5,175,727 | 12/1992 | Maher et al. . | |
| 5,191,593 | 3/1993 | MacDonald et al. . | |
| 5,195,086 | 3/1993 | Baumgartner et al. . | |
| 5,224,094 | 6/1993 | Maher . | |
| 5,228,026 | 7/1993 | Albrow et al. . | |
| 5,228,076 | 7/1993 | Hopner et al. . | |
| 5,229,989 | 7/1993 | Maher et al. . | |
| 5,260,938 | 11/1993 | Hofmann . | |
| 5,260,941 | 11/1993 | Wilder et al. . | |
| 5,276,678 | 1/1994 | Hendrickson et al. . | |
| 5,309,517 | 5/1994 | Barclay . | |
| 5,329,579 | * 7/1994 | Brunson | 379/88 |
| 5,357,511 | * 10/1994 | DiNapoli et al. | 370/263 |
| 5,392,278 | 2/1995 | Teel et al. . | |
| 5,416,779 | 5/1995 | Barnes et al. . | |
| 5,420,860 | 5/1995 | Stevens et al. . | |
| 5,430,725 | * 7/1995 | Field et al. | 370/458 |
| 5,440,545 | * 8/1995 | Buchholz et al. | 370/442 |
| 5,483,528 | 1/1996 | Christensen . | |
| 5,533,112 | 7/1996 | Danneels . | |
| 5,594,727 | * 1/1997 | Kolbenson et al. | 370/442 |
| 5,715,245 | * 2/1998 | Suonvieri | 370/442 |
| 5,719,858 | * 2/1998 | Moore | 370/442 |
| 5,991,634 | * 11/1999 | Hui et al. | 375/222 |

\* cited by examiner-

INTERCOM SYSTEM HAVING UNIFIED CONTROL AND AUDIO DATA TRANSPORT

CROSS-REFERENCE TO RELATED APPLICATIONS AND COPYRIGHT NOTIFICATION

This application depends for priority upon U.S. Provisional Patent Application Ser. No. 60/042,965 filed on Apr. 4, 1997 and entitled INTERCOM SYSTEM HAVING UNIFIED CONTROL AND AUDIO DATA TRANSPORT. A portion of the disclosure of the parent Provisional Patent Application contains material which is subject to copyright protection. The copyright owners have no objection to the facsimile reproduction, by anyone, of the patent document or the patent disclosure as it appears in the patent and trademark office patent file or records, but otherwise reserve all copyright rights whatsoever.

FIELD OF THE INVENTION

The invention relates generally to multi-user intercom systems and, more specifically, to an intercom system providing a fail-safe, redundant and scaleable architecture implemented with digital Time Division Multiplexing technology for integrated audio and control data transport.

BACKGROUND OF THE INVENTION

Intercom systems provide communication between two or more remotely located individuals. More advanced intercom systems provide conference-type communication, simultaneously connecting several intercom stations so that several individuals can communicate with groups and sub-groups of other system users.

Conventional conference-type intercom systems include a switch matrix, commonly referred to as a crosspoint switch, which allows any user to communicate with any selectable mix of the remainder of the users. Crosspoint switches are normally used instead of direct point-to-point connections between source and destination equipment for all but the smallest implementations. A thorough discussion of prior art crosspoint switching schemes can be found in U.S. Pat. No. 5,483,528 to Christensen, incorporated herein in its entirety by reference.

With crosspoint switches, all stations are connected directly to the crosspoint switch matrix which makes connections between the sources and destinations internally. In order to accommodate large numbers of switched audio channels, intercom systems typically distribute the crosspoint matrix across a number of bussed circuit modules or cards. Each module typically controls switch closures for connecting audio to or from a small group of intercom stations for which it is responsible. Each module typically employs a small local computer whose duties include, but are not limited to:

a) Making and breaking audio crosspoint closures;
  b) Data communications with those intercom stations connected to it;
  c) Data communications with other matrix modules via a central data communications controller.

A significant disadvantage of crosspoint switches is the geometrically increasing size and cost of the switch matrix relative to the number of intercom users to be interconnected. For example, although a four station matrix requires only 16 switches and an interconnect backplane containing 4 circuit paths, a 100 station matrix requires 10,000 switches and dedication of 100 backplane circuit paths. Thus the available matrix-of-switches crosspoint topology is practical only for relatively small systems.

Noise considerations also become more important as matrix-switch-based intercom systems grow in size. Resistive summing of multiple analog sources into a common destination results in signal-to-noise degradation. Driving multiple destinations from a single source requires the addition of analog buffers to meet impedance-matching fanout requirements. These buffers also degrade signal-to-noise performance.

Partially addressing these problems, the Christensen patent discloses a system which interconnects intercom stations, making use of Time Division Multiplexing (TDM). In this system, multiple audio signal sources (stations) are periodically sampled and digitized at a high frequency and interleaved cyclically onto a parallel bus. At each destination (station) on the bus, a receiver picks from the data stream the digitized samples associated with a given source or combination of sources. It converts these signals to analog voltages and reconstructs the original analog waveform or combination of waveforms by interpolating (integrating) between the sequential samples taken from the bus.

Although TDM greatly improves the efficiency of audio transport in intercom systems, traditional intercom systems (even the system disclosed in Christensen) suffer limitations in the transport of the large volume of control data upon which intercom system operation depends. Consider, for example, the requirement for any practical intercom system, that an audio connection be established very quickly, and usually bi-directionally. Control messages must pass between intercom stations over narrow bandwidth data channels, separate from the audio channel, typically through an intermediary or central data communications controller to establish the audio connection. The station initiating the conversation must notify the second station, through the intermediary, that it desires to establish a talk-listen connection. The second station then acknowledges the first station's request and replies with a request to establish its own talk-listen connection, also through the intermediary processor. As system complexity and size increase, the number of messages passed between stations escalates, and the limited bandwidth of the data links, especially when implemented as serial data channels, tends to become a bottleneck for data flow. If the intermediary processor and its communications links delay the control message-passing to any great degree, the delay can become objectionable to users of the intercom. The party attempting to initiate a conversation may begin to speak before the link is established, causing the second party to receive a truncated, unintelligible message. The common intercom topology employing serial control communications through an intermediary processor, even including TDM-based audio signal transport, can be overwhelmed by the volume of data transactions when an intercom system reaches a critical size.

Also, if the central communications processor malfunctions, the capacity for data communication is lost and cannot be reestablished until the central processor is repaired or replaced. Avoiding this failure mode by using redundant central communications processors tends to be awkward and complicated.

An additional flaw in some available systems can be found in the use of the TDM bus for transport of mixed and attenuated audio signals. This redundant use of the TDM bus narrows the available bandwidth for more critical primary audio transport between stations and would preferably be avoided.

Therefore, as demand grows for ever larger intercom systems, the industry needs a mechanism which provides wider bandwidth data communications to support the increased channel capacity of TDM audio transports. Preferably such a system would provide immunity from catastrophic single-point failure without the appreciable complexity of redundant central data communications processors.

SUMMARY OF THE INVENTION

To address the shortcomings of available crosspoint-based and TDM-based intercom systems which use a central communications and control processor as an intermediary in the transport of control signals between intercom stations, the present invention provides a network of peer processor-controlled circuit modules comprising a plurality of processor circuit modules connected to a common, time-division-multiplexed (TDM) bus, wherein bandwidth on the TDM bus is shared between a digital audio data transport and an inter-processor control message.

In a preferred embodiment, each of the processor circuit modules includes a control data communications circuit (CDCC) functioning as a communications co-processor and comprising means for automating the transmission and reception of simultaneous variable-length control messages among any number of the peer processor-controlled circuit modules using the TDM parallel bus, means for interleaving the control message with the audio data on the TDM parallel bus, and means for distributing the audio data and control data to a plurality of peripheral equipment stations capable of generating and receiving audio and control data. Means for providing automatic notification at every processor-controlled circuit module on the network when any other processor-controlled circuit module connects to or disconnects from the network is also provided for more rapid inter-processor communication.

Although the modularity of this system may appear similar to available system designs with respect to the fact that interconnected circuit modules each manage traffic to and from groups of peripheral stations (such as intercoms), a fundamental distinction exists between this implementation and those available, in that no central intermediary or processor controls the overall system operation nor does any single processor or intermediary control data communications among modules. The invention provides vastly increased data communications bandwidth over the serial implementations previously employed by intercom systems, and eliminates the risks of central processor failure in establishing and maintaining audio paths. This new intercom system includes an audio signal attenuation and mixing scheme which does not require mixed signals to re-enter the bus after attenuation and mixing is complete, thereby allowing additional bandwidth for control and audio data transfer among intercom stations.

A primary advantage of the present invention is the high speed of control data transport among the modules, as compared with existing serial data communications implementations employed in existing intercoms.

Another advantage of the present invention is the economy of shared hardware resources which manage both audio transport and data communications.

Another advantage of the present invention is the safety from catastrophic single-point failure previously associated with a hierarchical communications scheme, i.e. a single central communications and control processor over multiple slave controllers.

Still another advantage of the present invention is the small size of the system hardware.

Still another advantage of the present invention is the bus-independent attenuation and mixing scheme provided.

Still another advantage of the present invention is the re-configurability of the intercom system layout and features.

Yet another advantage of the present invention is the scaleable nature of the provided architecture, providing the ability to interconnect over a thousand stations on a single distributed system.

Another advantage of the present invention is the ability to integrate available digital phone line technology to provide a geographically distributed, reliable intercom system to a large group of users.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings in which.

DETAILED DESCRIPTION OF THE DRAWINGS

Figure 1:
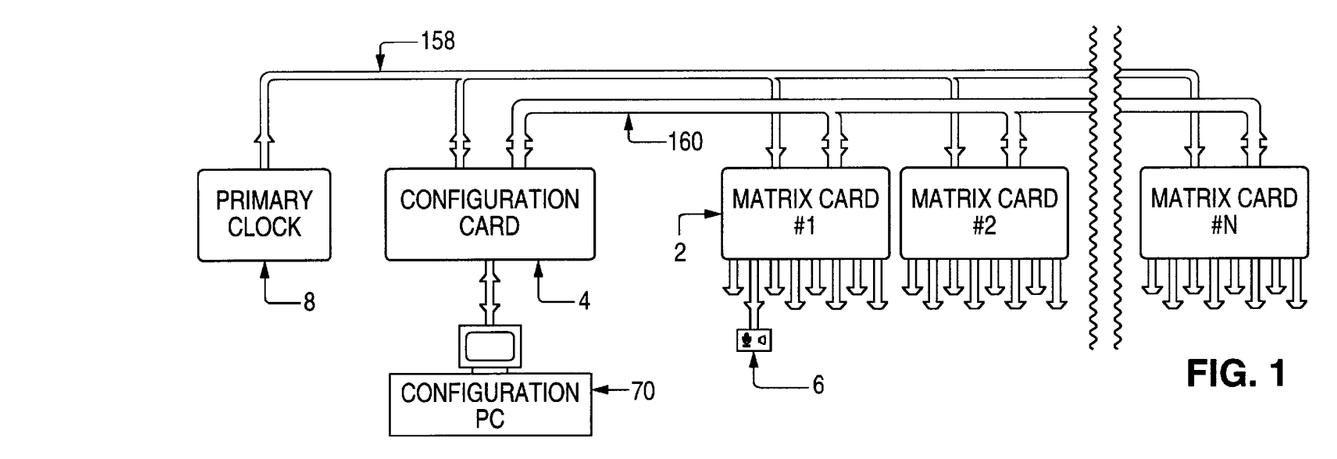
FIG. 1 is a simplified block diagram of the intercom system of the present invention.

FIG. 1 provides a system-level block diagram of the intercom of the present invention. TDM Data Bus 160 and TDM Control Bus 158 interconnect the cards in the intercom system matrix rack. Sixteen-bit-wide TDM Data Bus 160 provides transport for audio among all Matrix Cards 2 and provides inter-processor communication among all Matrix Cards 2 and the Configuration Card 4. The only system card not attached to the TDM Data Bus 160 is the primary clock card 8 which possesses neither intelligence nor communications capability.

TDM Control Bus 158 provides system-wide synchronized timing signals to all cards 2 and 4, thereby providing the foundation for data flow across TDM bus 160. TDM Control Bus 158 consists of Primary and Secondary (Backup) Clock Groups, generated respectively on the Primary Clock Card 8 and the Configuration Card 4. Circuitry on the Configuration Card 4 continuously monitors the quality of signals in the Primary and Secondary Clock Groups and arbitrates system use of these signals.

The presently preferred embodiment of the intercom system includes as many as twenty-five Matrix Cards 2 and two hundred intercom stations 6, although a plurality of systems may be linked, resulting in a much larger overall count of interconnected stations, in a manner discussed below. The system illustrated in FIG. 1 includes "N" Matrix Cards 2, numbered for reference from #1 to #N. Eight intercom stations 6 may be connected to each Matrix Card 2 in the presently preferred embodiment, but more may be accommodated in a manner depending upon packaging constraints. It should be noted that stations 6 are denoted as intercoms because these are anticipated as the most common audio and data peripheral equipment to be used within the inventive system. However, any audio and/or data generating and/or receiving peripheral may be used, e.g., telephones, control equipment, and satellite link-up equipment.

The Primary Clock Card 8 is the source of Primary TDM Clock and Synchronization signals which are broadcast to all other cards in the system over the TDM Control Bus 158. Configuration computer 70 is connected to Configuration Card 4 via an RS-232, Ethernet, or compatible local connecting mechanism, providing a friendly interface to an intercom system user for modifying system configuration and events.

Figure 2:
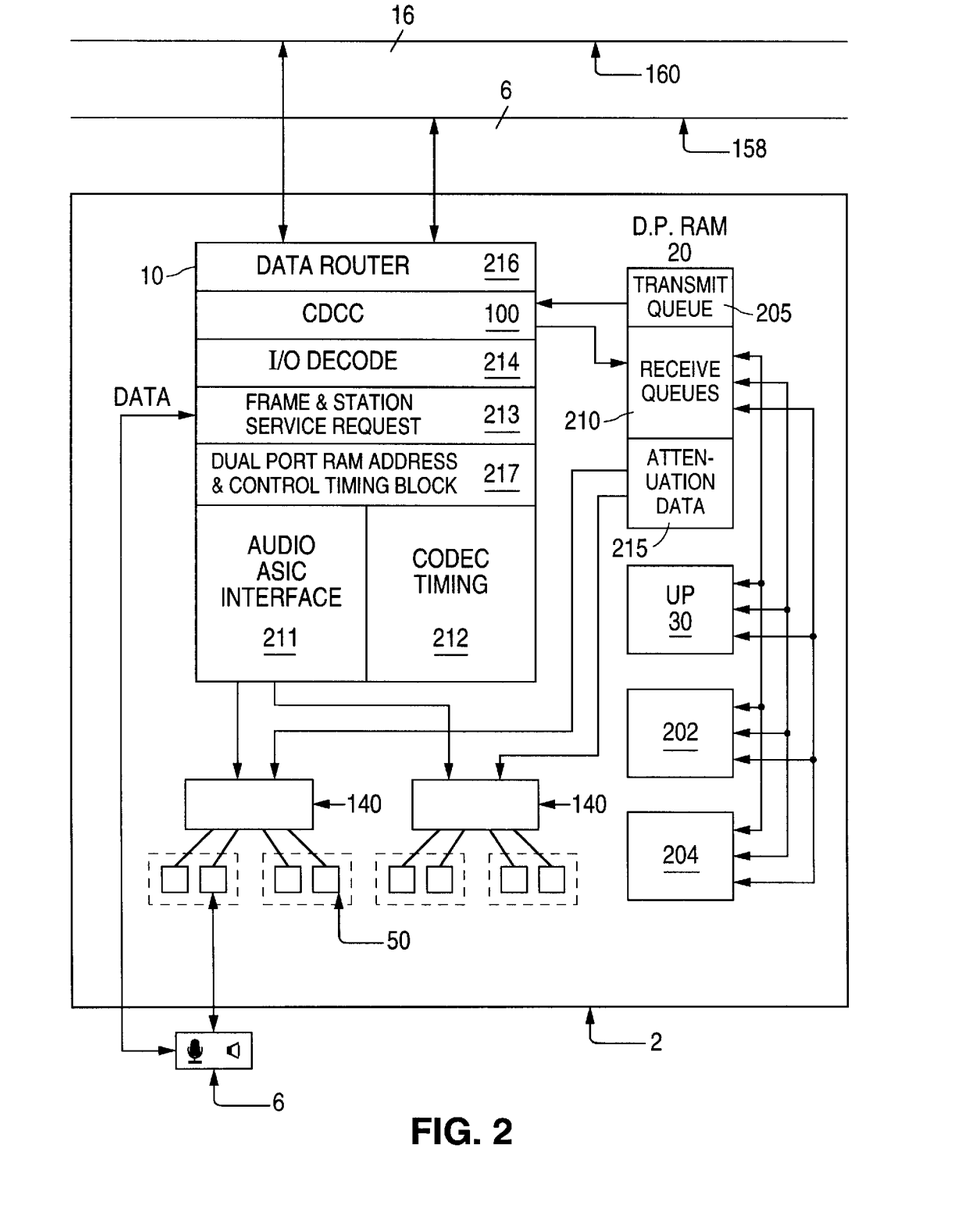
FIG. 2 is a block diagram of a Matrix Card used in the intercom system of the present invention.

FIG. 2 provides a block diagram illustrating relevant features of Matrix Card 2. Control Application Specific Integrated Circuit (ASIC) 10 and Audio ASICs 140 are preferably very large gate arrays or field programmable gate arrays (FPGAs), but possibly any other device(s) of sufficient density and possessing a definable internal architecture. Taken together as a subsystem, these ASICs provide the core functions required of a Matrix Card 2, providing the audio and control data interface between eight intercom stations 6 and the TDM bus 160. As similar control ASIC 610 resides on the Configuration Card 4, as shown in FIG. 3.

Figure 3:
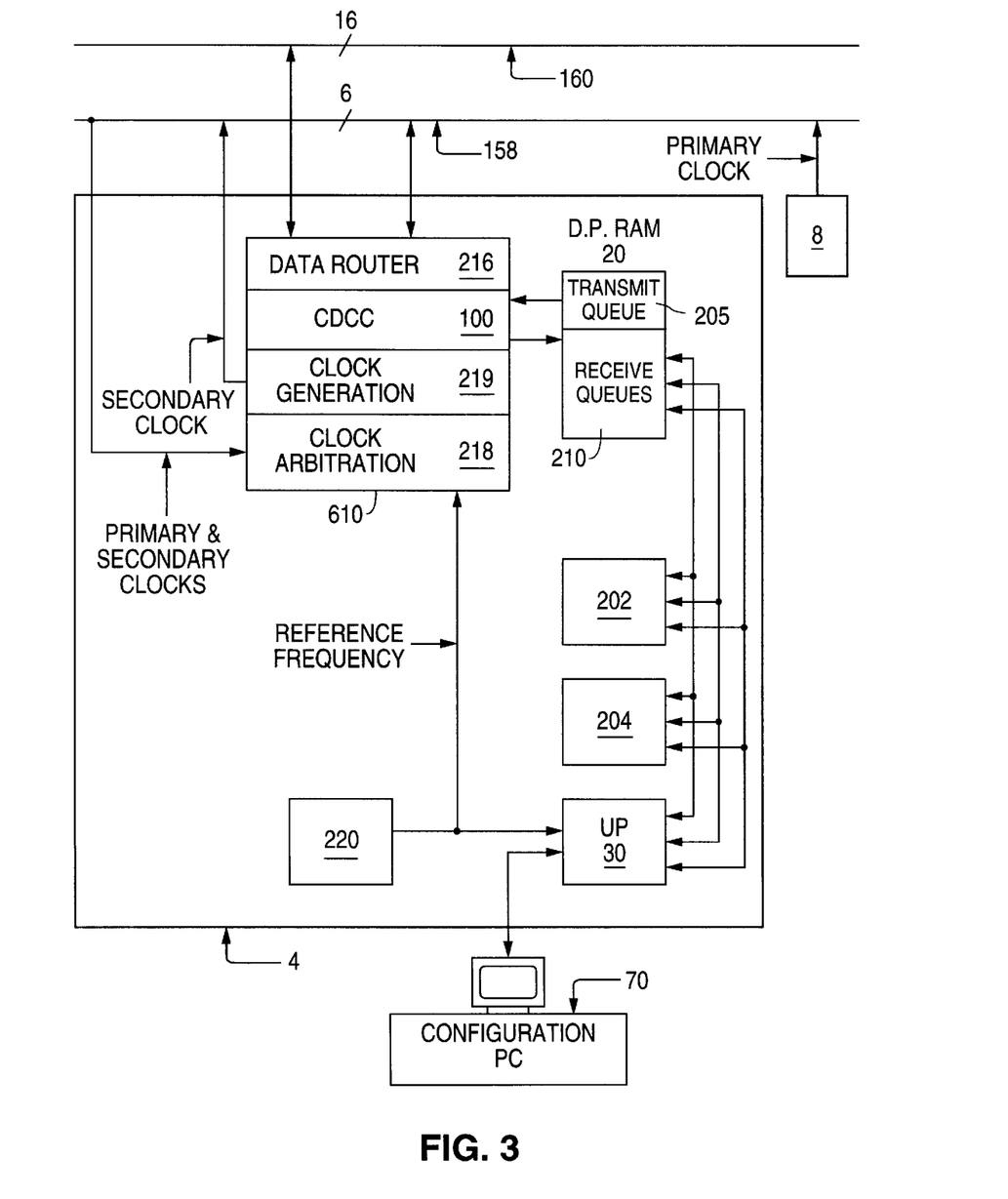
FIG. 3 is a block diagram of a Configuration Card used in the intercom system of the present invention.
Figure 4:
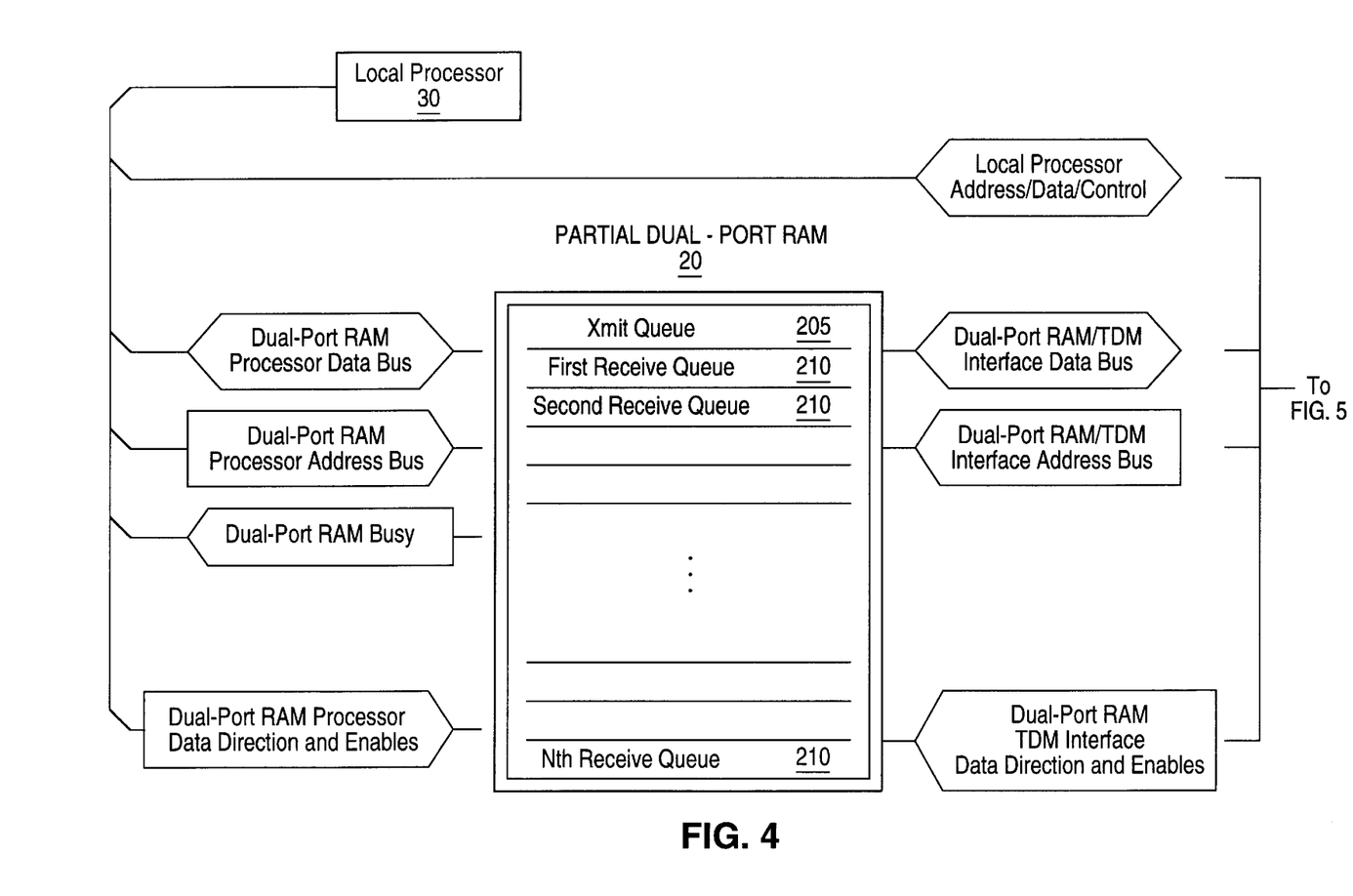
FIG. 4 is a diagram of that portion of dual-port RAM used to provide data queues in conjunction with the CDCC described below, in the intercom system of the present invention, wherein lines 132, 134, and 136 provide interconnect to the CDCC block illustrated in FIG. 5.
Figures 5, 5A:
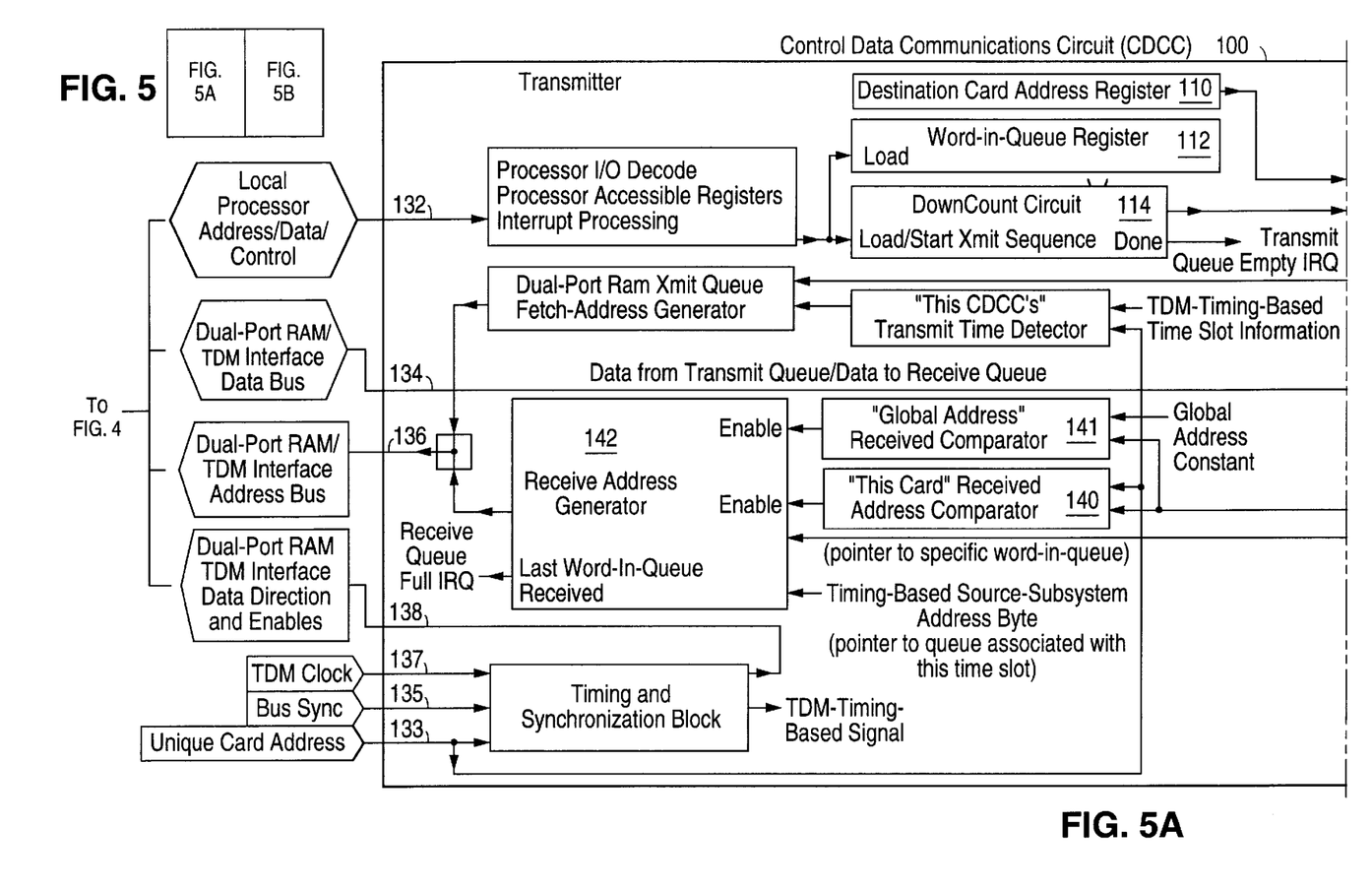
FIG. 5 is a block diagram of the preferred Control Data Communications Circuit (CDCC) employed on the Configuration Card of FIG. 2 and the Matrix Card of FIG. 3, wherein lines 132–138 provide interconnect to the dual-port RAM portion illustrated in FIG. 4 and other resources on the Matrix Card illustrated in FIG. 2.
Figure 5B:
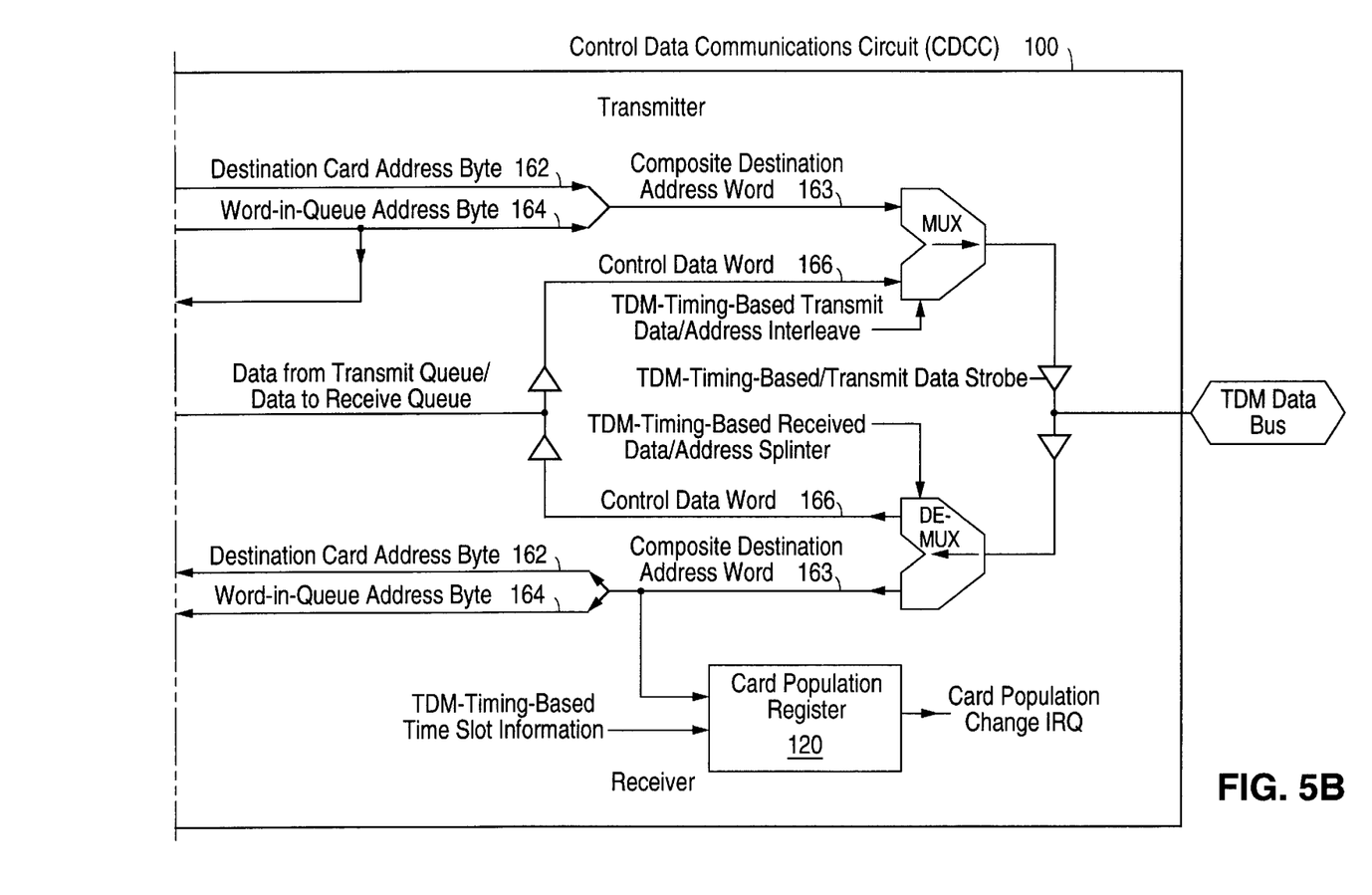

Referring to FIGS. 2 and 3, on both cards 2 and 4 non-volatile ROM blocks 202 provide the code memory for a local microprocessor 30 and preferably comprises a flash-type memory to allow remote code revision without memory device replacement. At system power-up, or whenever a new Matrix Card 2 is hot-patched into a system under power, Matrix Card configuration information is loaded into a configuration data volatile memory 204 (RAM) on Matrix Card 2 Configuration Card 4. The loaded data describes for example, the function and electronic labeling of distinct switches at intercom stations 6 connected to the newly connected or newly powered-up Matrix Card 2, and the groupings of intercom stations 6 throughout the system for ease of use by a plurality of users each having different communications needs for the system. Control ASIC 10 implements the main interface and processing circuitry for audio and control data flow between the Matrix Card 2 and the remainder of the system, including audio ASIC interface block 211, CODEC timing block 212, frame and station service request block 213, I/O decode block 214, Control Data Communications Circuit (CDCC) block 100, data routing block 216, and dual-port RAM address control timing block 217. A detailed block illustration of preferred Control Data Communications Circuit (CDCC) 100, used on Matrix Card 2 and Configuration Card 4, and implemented in control ASICs 10 and 610 (along with additional circuitry not shown) is shown in FIG. 5. Other circuitry, some of which is common to all types of embedded control applications, needs no further amplification here.

Configuration Card 4 provides several important system functions, but is preferably neither a repository of central control nor an arbiter of communications over other system cards. Its primary functions are to:

a) provide (preferably multiple sets of) globally accessible configuration data for all system parameters;

b) provide Secondary Clock Group signal generation c) monitor Primary and Secondary Clock Group signal quality d) dictate system-wide choice of Primary or Secondary Clock Group signals;

e) communicate with Configuration PC 70 to acquire new system configuration data and log system events;

f) provide miscellaneous system monitoring functions, such as temperature measurement and alarm monitoring;

g) provide real-time clock maintenance by utilizing clock arbitration block 218 and clock generation block 219 in combination with reference clock 220.

The reader should note that Configuration Card 4 need not be present in an operating intercom system to send audio or control messages from one Matrix Card 2 to another. The intercom system will continue to operate without any interruption in audio transport or interruption in the capacity to make and break connections between stations even if the Configuration Card 4 is unplugged during system operation.

As the Control Data Communication Circuit (CDCC) 100 in Control ASICs 10 and 610 is common to the core logic on the Matrix Card 2 and the Configuration Card 4, we will begin with a discussion of this important topic.

Referring to FIG. 5, fundamental to the present invention's inter-card data communications is the Control Data Communications Circuit (CDCC) 100. CDCC 100 resides in the control ASICs 10 and 610 on all Matrix 2 and Configuration 4 Cards, respectively. Both Matrix Card 2 and Configuration Card 4 will be collectively referred to as "cards" for the remainder of this discussion, since for the purposes of this discussion the CDCCs on both card types possess, by design, much of the same hardware, are driven by similar communications software, and exhibit substantially identical behavior. CDCC 100 automates multiple variable-length block data transfers simultaneously among any number of these cards on the TDM Data Bus 160, thereby relieving the system of the requirement for a centralized, intermediary processor. CDCC 100 comprises transmitter and receiver sections which interface to a single source (transmit) queue 205 in dual-port RAM 20 local to the same card and a plurality of destination (receive) queues 210, also in dual-port RAM 20.

As a control-message source, the transmit portion of each CDCC 100 in the intercom system may specify either a unique destination card receiver (which may even be the receiver on the transmitting card itself) or a global (multi-card) destination for a given message. The receiver portion of each CDCC 100 automatically acquires all control-messages for which it is the intended recipient, even when a plurality of cards simultaneously send it messages. This network implementation results in the transport of multiple simultaneous control messages without contention for hardware resources unlike existing serial communications implementations. The intercom incurs no software arbitration overhead since the protocol is almost entirely implemented in hardware; the CDCC receiver portion is not overloaded even if it simultaneously receives control-messages from every card in the intercom system since it has a separate receive queue 210 for each possible message source.

A CDCC 100 manages the movement of blocks of data among multiple cards 2 and 4 using a portion of the bandwidth (refer to FIG. 6) of the TDM Data Bus 160. Each CDCC contains transmitter and receiver components whose common timing elements are synchronized by TDM frame synchronizing signals. (For the sake of brevity, source and destination components of CDCCs will be referred to as labeled in FIG. 5; the reader should understand that source and destination components are included on all CDCCs.)

In moving variable-length data blocks, each card's local microprocessor 30 and the CDCC 100 both access data queues from opposite sides of shared dual-port RAM 20. In sending a message, the microprocessor 30 stores data to a transmit (XMIT) queue 205. The CDCC transmitter automatically reads queue 205 and dispatches appropriately-timed data onto TDM bus 160 from it. Upon completion, the CDCC 100 transmitter portion interrupts the source card microprocessor 30 to indicate the availability of transmit queue 205 for the next message. CDCC receiver circuitry at the destination card automatically recognizes all data for which it is the intended recipient and places each incoming TDM datum into the receive queue 210 in dual-port RAM 20 associated with the address of the transmitting CDCC. After receiving a complete message, the destination CDCC interrupts its local microprocessor 30, which reads an internal register in the CDCC indicating which receive queue(s) contain(s) the new message(s).

Figure 6:
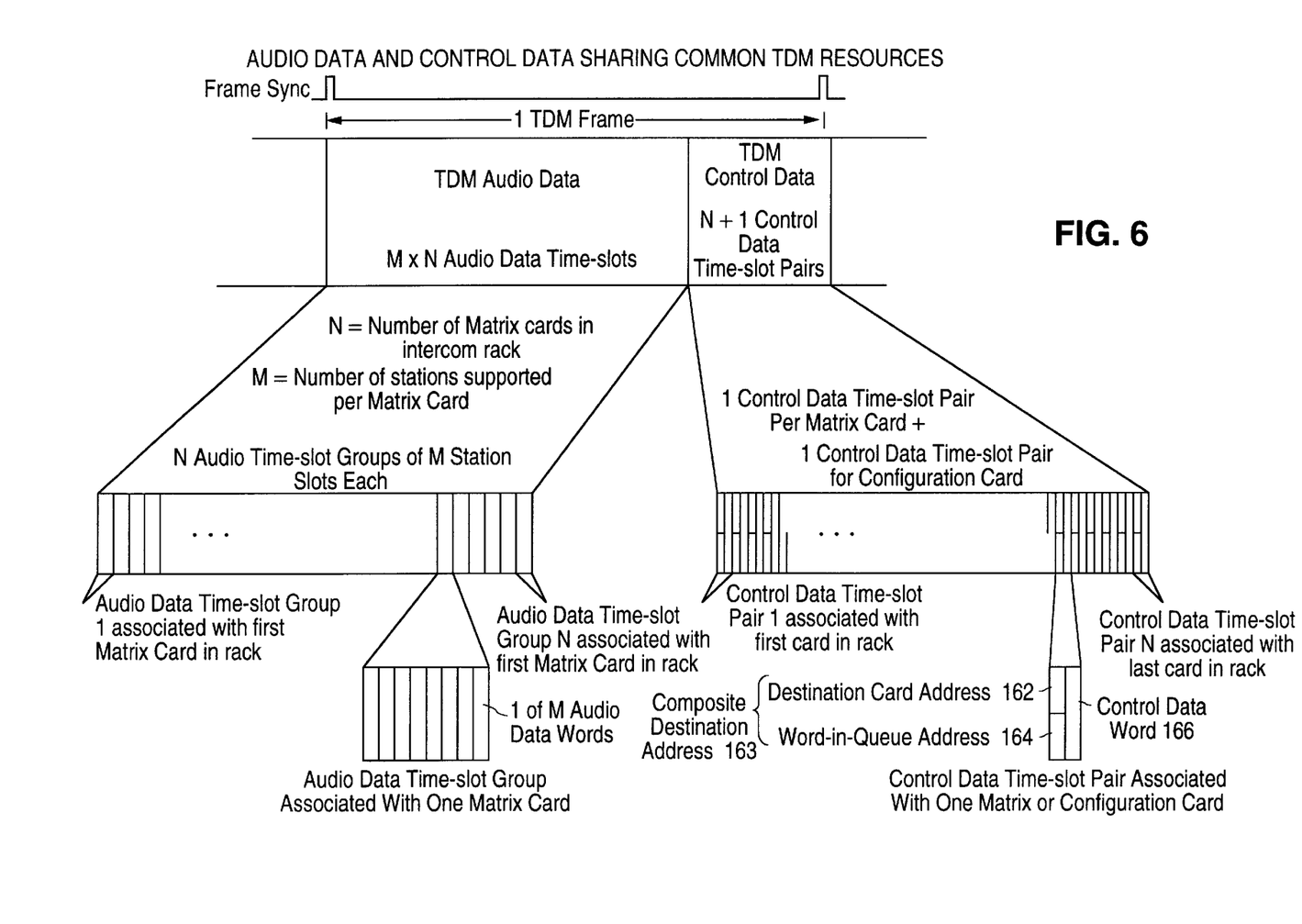
FIG. 6 illustrates the manner in which Audio Data transport and Control Data Communication share the TDM Time Frame in the system of the present invention.

Describing the process of sending a control message to a destination card in greater detail, the microprocessor 30 at the source card 2 or 4 performs three steps: First, the microprocessor 30 loads a variable-length message into the region in the dual-port RAM 20 reserved to hold the CDCC's transmit queue 205, and retains the location of the last message word (offset address from start-of-queue) through the second step, below; Second, the source microprocessor 30 writes the destination card's identity (address) in its Destination Address Register 110; Third, the source microprocessor 30 establishes the size of the variable-length message to be sent by specifying to its CDCC transmitter the location of the highest numbered data word in its transmit queue 205. This third step is accomplished by loading the offset of the last message word (retained from the first step, above) into its CDCC's Word-In-Queue Register 112. The CDCC's transmit hardware portion offsets the base address of its transmit queue 205 with the Word-In-Queue Register 112 and uses that combined address to fetch the (highest-numbered) first word of the message from its own transmit queue 205 in dual-port RAM 20. As the message is sent, the Word-In-Queue is regenerated at the receiver (described below) and the receiver uses this address offset to place the message data into the same-numbered location(s) in its receive queue 210. In loading its Word-In-Queue Register 112, the source microprocessor 30 triggers the process whereby the CDCC 100 transmit hardware portion automatically dispatches the message, one word per TDM frame, onto TDM bus 160 without further microprocessor 30 intervention. CDCC 100 transmitter hardware portion then concatenates the address byte from the destination CDCC's Address Register 110 with the Word-In-Queue Register 112 to form a Composite Destination Address Word 163, which is broadcast on TDM data bus 160 during the first time-slot of the time-slot pair assigned to the source card (based on the card's system address). Reference to FIG. 6, below, provides slot-pair structure details.

During each TDM frame, each CDCC 100 drives the TDM bus 160 during a particular, pre-designated time-slot pair determined by the source microprocessor's unique system address stored at register 133. As illustrated in FIG. 6, the first time-slot within the slot pair contains the source CDCC's Composite Destination Address Word 163, which includes both the Destination Card Address in the high byte 162 of the Composite Destination Address Word 163 and the Word-In-Queue address at low byte 164 of the Composite Destination Address Word 163. During the second time-slot of the pair, designated the Control Data Word Time-Slot 166, the source CDCC places a control data word from it's transmit queue 205 onto TDM bus 160. Down-counter 114 automatically decrements Word-In-Queue Register 112 as each successive word of control data is transmitted. After sending the last word of the control message, in successive data frames, the source CDCC recognizes that Word-In-Queue Register 112 has decremented through zero and generates an interrupt (IRQ) to notify its microprocessor 30 that its transmit queue 205 is empty and available for the next message.

After transmit queue 205 is emptied, and until local microprocessor 30 gives the CDCC 100 transmitter hardware portion new data to transmit along with a new destination address, the CDCC transmitter hardware portion remains in an Idle state. While Idle, the CDCC transmitter hardware portion continues to drive TDM bus 160 within its assigned time-slot pair with a Composite Destination Address Word 163 that points to a non-existent destination card, but identifies this CDCC's card 2 or 4 as active in the intercom system. In fact, each card active on the intercom system's peer network transmits a Composite Destination Address Word 163 during the first time-slot of the time-slot pair assigned to that card on the basis of its unique system address, without regard to whether it is in an Idle state. The contents of this word is always distinguishable from the state of the undriven bus; every card's CDCC 100 receiver hardware portion inspects the contents of TDM bus 160 during all such time-slots and thereby determines which other cards 2 or 4 are connected to the network without polling the network for resident cards. The inventive CDCC 100 takes advantage of this fact by mapping the connection state of each card in the system to a bit in the multiple-word Card Population Register 120. Each card's CDCC provides additional circuitry which detects changes in the connection status of cards and generates a microprocessor 30 interrupt (IRQ) when any card joins or leaves the intercom system.

When the hardware receiver portion at the destination CDCC 100 recognizes its own address in the Destination CDCC Address field of a Composite Destination Address Word 163 at comparator 140, or recognizes a global message address at comparator 141, it accepts the word placed in the next time-slot on the TDM bus as message data intended for itself. The CDCC's Receiver Address Generator 142 determines which receive queue 210 will receive the new data, having derived the address of the source from observation of the time-slot during which the matching Composite Destination Address Word 163 was received. Data received from card 1 is routed to queue 1, etc. The receiver CDCC places the data in a location in that queue specified 5 by the Destination Word-In-Queue field of the Composite Destination Address Word 163. For example, data received from the source card's transmit queue 205 word number 17 is routed to the appropriate receive queue 210 word number 17, etc. When the destination CDCC recognizes that the incoming Word-In-Queue field has finally decremented to zero, indicating the reception of the last data word, it interrupts its local microprocessor 30, and indicates by means of the Frame and Station Service Request block 213 which receive queue 210 contains the new message.

Turning next to the manipulation of audio signals and referring to FIG. 2, the Matrix Card 2 core logic subsystem acquires, from the encoder sections of serial CODECs 50, bit streams representing audio signals from each of the intercom stations connected to its Matrix Card 2. It should be noted that the preferred system includes a single, dual-use CODEC 50 for every two intercom stations 6. The core logic synchronously converts this audio signal data to a form which it places on TDM bus 160 during a specific group of audio time-slots, based on the card's physical location (address) in the intercom rack, as illustrated in FIG. 6. Each card in turn places its group of digitized audio samples onto the TDM bus. From these data, all cards can sample any of two hundred channels of interest in a fully populated system.

Figure 7:
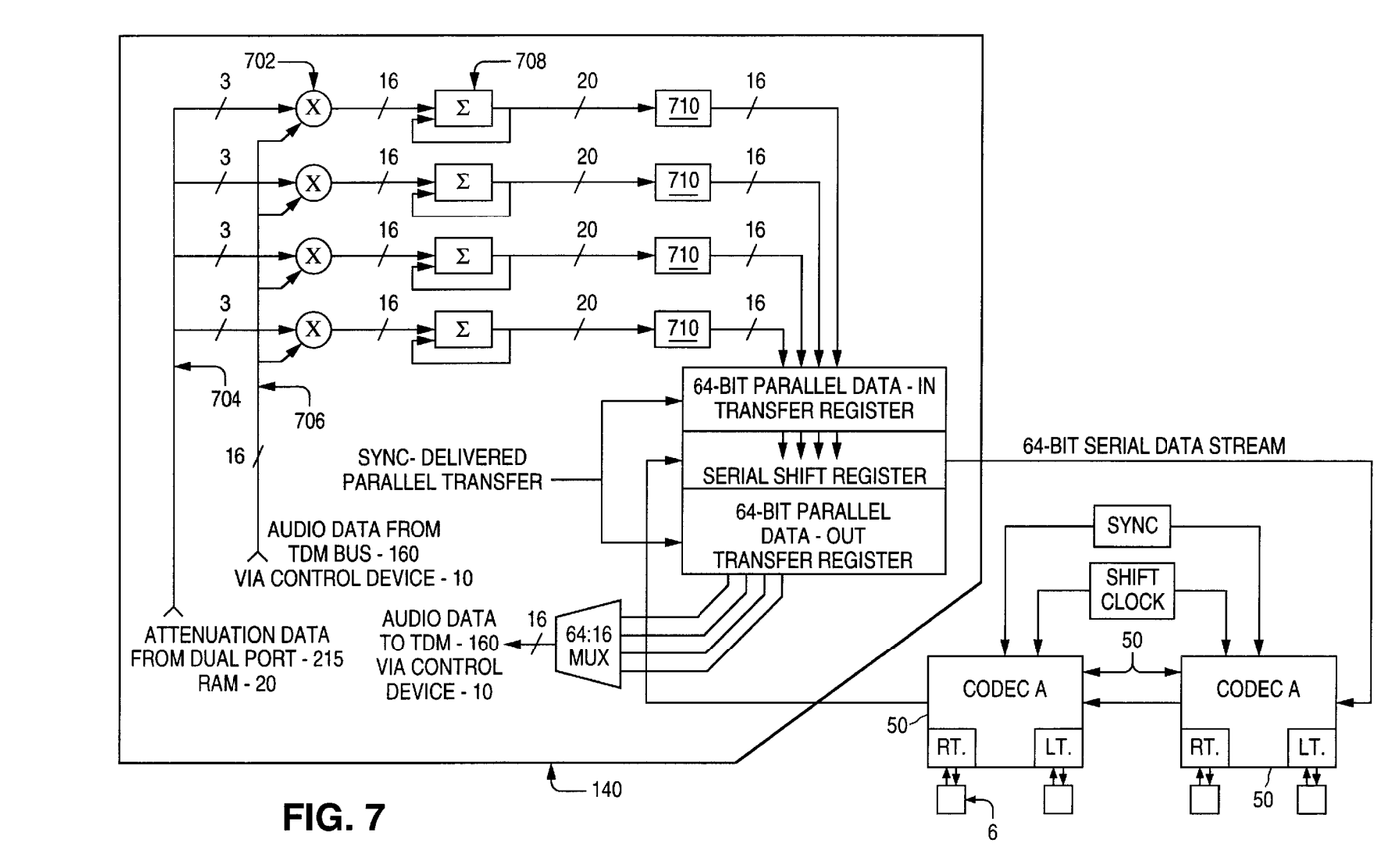
FIG. 7 is a block diagram illustrating a preferred hardware audio circuit implemented in an application specific integrated circuit on the Matrix Card of FIG. 2.

The Matrix Card 2 core logic subsystem connects audio sources on TDM bus 160 to each of eight local station destinations 6, as if connected through a crosspoint switch. However, in this implementation the "switch" possesses faders (not shown) at the input to every crosspoint, a concept termed Variable Listen Levels. In other words, the core logic of Matrix Card 2 enables each destination station 6 to receive audio from any conceivable mix of the stations which communicate through the Matrix Cards 2 in the intercom system to TDM bus 160, as if connected by a crosspoint switch. However, by means of Variable Listen Levels in the current invention, each station's audio contribution can be individually adjusted relative to that of the other stations in the mix. This feature is useful in establishing a hierarchy of users, where some important user, perhaps a director or producer, needs to be monitored at a higher level than other audio sources, yet not completely kill the other sources in the mix. An intercom user may also employ Variable Listen Levels to boost the level of a soft speaker (or attenuate a loud one) relative to other users of the intercom, by means of depressing a key (not shown) on intercom station 6. Variable Listen Levels enables the current invention to provide a unique related feature, called Psychoacoustic Level Control. This term applies to the situation in which the user of an intercom who wishes to boost the level of a particular station eventually runs out of gain because of an exceptionally weak audio signal on the channel of interest. In the current invention, when no additional boost is available to listen to a particular channel, successive key-presses intended to raise the volume of a desired signal instead automatically attenuate the other signals in the mix. This gives the user the impression of increasing the loudness for the channel of interest. To accomplish this mixing of audio with Variable Listen Levels, the core logic of Matrix Card 2 possesses eight identical audio acquisition circuits providing audio to a destination station connected to a Matrix Card 2 (refer to FIGS. 2, 6, and 7). Circuitry in the Control ASIC 10 portion of the core logic simultaneously fetches an audio sample from the TDM bus and attenuation data from dual-port RAM 20, during each of the two hundred audio data slot-times in the TDM frame illustrated in FIG. 6. The attenuation data across lines 704 and audio sample across lines 706 meet at an attenuator circuit 702 shown in FIG. 7, where the attenuation data effectively provides the connection for a particular channel of audio data to the destination station, as follows: If the attenuation data indicates infinite attenuation, the TDM data from that source station is not connected to the destination station; if the attenuation data indicates no attenuation, then the station currently being sampled is mixed in at fill volume; other attenuation values provide for variable amounts of the source signal to be passed into the mix of signals. After attenuation, whatever remains of a station's audio sample next passes to an accumulator 708 which arithmetically sums two-hundred sequential values at its input. Most of these values are zero under normal circumstances, since the user rarely desires to simultaneously listen to two-hundred stations. Attenuator 702 provides several bits of headroom to allow for the occurrence of out-of-range sums without numeric wrap-around. Clipper 710 cleanly removes these bits. The bulk of the remainder of the logic relating to the audio deals with synchronizing the serial interlaced bit streams from the audio CODECs 50 with the ongoing TDM activity.

Figure 8:
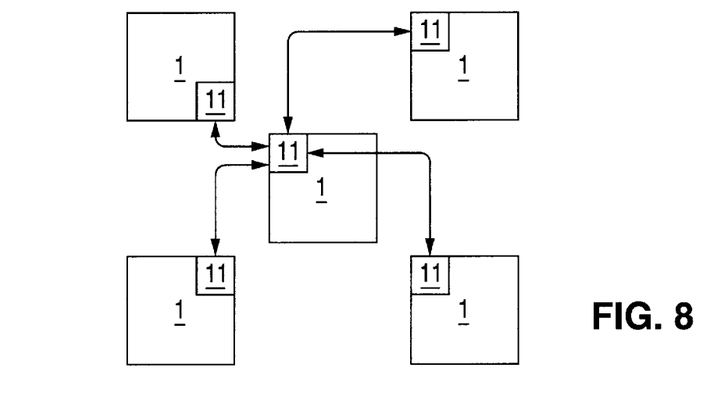
FIG. 8 illustrates a scaled architecture including a plurality of systems illustrated in FIG. 1 interconnected to create a system having far greater user capacity while maintaining optimal audio bandwidth.

Referring next to FIG. 8, a large-scale system architecture is provided, comprising a plurality of the systems 1 shown in FIG. 1 interconnected either locally or across long distance spans using digital telephone line connections, such as a T-1 telephone lines. The plurality of systems 1 are preferably interconnected by substituting a system interconnect card 11 for one Matrix Card 2 in a central system. Instead of connecting to up to eight intercom stations 6 (as would a Matrix Card 2), interconnect card 11 connects to up to eight additional intercom systems 1, each potentially having its own interconnect card 11 which may connect to still additional systems 1. While interconnect cards 11 are very similar to Matrix Cards 2 described above, there are minor distinctions intended to deal with system addressing which will be understood by those skilled in the art to which the present invention pertains.

While the present invention has been described with reference to certain preferred embodiments, those skilled in the art will recognize that various modifications and other embodiments may be provided. These other embodiments are intended to fall within the scope of the present invention. For example, larger system bus widths may be utilized to increase system throughput and are clearly within the scope and spirit of this description. Similarly, alterations may be made to the layout of CDCC 100 without sacrificing the ability to transport control data from peer to peer in the intercom system without utilizing a single intermediary processor. In addition, the control data transport mechanism of the described intercom system may be incorporated into other electronic systems wherein high speed control communication is desired or necessary. Accordingly, all such modifications and additions are deemed to be within the scope of the invention which is to be limited only by the claims appended hereto.

What is claimed is:

1. A network of peer processor-controlled circuit modules comprising:

a plurality of processor-controlled circuit modules; and a common, time-division-multiplexed (TDM) parallel bus in electrical communication with the processor-controlled circuit modules;

wherein bandwidth on the TDM parallel bus is shared between a digital audio data transport and inter-processor control messages;

wherein each of the plurality of processor-controlled circuit modules includes its own control data communications circuit (CDCC) functioning as a communications co-processor, the CDCC comprising:

means for automating the transmission and reception of simultaneous variable-length control messages among any number of the peer processor-controlled circuit modules using the TDM parallel bus; and means for interleaving the control message with the audio data on the TDM parallel bus.

2. A network of peer processor-controlled circuit modules comprising:
   a plurality of processor-controlled circuit modules;
   a common, time-division-multiplexed (TDM) parallel bus in electrical communication with the processor-controlled circuit modules;
   wherein bandwidth on the TDM parallel bus is shared between a digital audio data transport and inter-processor control messages;
   wherein each of the plurality of processor-controlled circuit modules includes its own control data communications circuit (CDCC) functioning as a communications co-processor, the CDCC comprising:
      means for automating the transmission and reception of simultaneous variable-length control messages among any number of the peer processor-controlled circuit modules using the TDM parallel bus; and
      means for interleaving the control message with the audio data on the TDM parallel bus; and
      means for providing automatic notification at every processor-controlled circuit module on the network when any other processor-controlled circuit module connects to or disconnects from the network.

3. The network of claim 1, wherein:
   the TDM parallel bus transports interleaved audio data and control messages among the processor-controlled circuit modules; and
   the network comprises an intercom system which uses the processor-controlled circuit modules to process the audio data and control data and distribute the audio data and control data to a plurality of peripheral equipment stations, the peripheral equipment stations being capable of simultaneously generating and receiving both audio data and control data.

4. The system of claim 1,
   wherein at least one of the circuit modules comprises a configuration card providing system parameter configuration data to the bus, the configuration data being alterable by a user accessible computer; and
   a first plurality of the circuit modules comprise matrix cards, the matrix cards having alterable random access memory (RAM) capable of receiving configuration information across the bus from the configuration card in response to changes in system layout or function, the changes being implemented by a user through the user accessible computer; and
   the matrix cards exchanging data in a manner independent of the configuration card.

5. The system of claim 1, further comprising a clock card for creating synchronization signals sent across a second system bus.

6. An intercom system comprising:
   a bus for transporting data, the data comprising both control messages and audio data;
   a plurality of circuit modules in electrical communication with the bus for processing the data;
   each one of the circuit modules being in electrical communication with at least one peripheral station which transmits and receives the data processed by the one of the circuit modules to which the peripheral station is in electrical communication;
   wherein the data, comprising the control messages and audio data, are transported by the bus within an integrated data frame;
   wherein the circuit modules are of the same type and each comprise:
      means for generating a uniquely addressed control message;
      means for placing the uniquely addressed control message in a transmit buffer;
      means for finding an appropriate time slot corresponding to a uniquely addressed destination circuit module within the integrated data frame for placing the uniquely addressed control message;
      means for placing the uniquely addressed control message on the bus with a destination datum;
      means for receiving the control messages on the bus and sorting from the control messages a plurality of simultaneous uniquely addressed control messages sent by other circuit modules, acting as source circuit modules, intended for the circuit module as a destination circuit module; and
      means for accepting the sorted, uniquely addressed control messages into separate receiving buffers assigned to the corresponding source circuit modules.

7. The intercom system of claim 6, wherein any one of the plurality of circuit modules may receive messages simultaneously from any number of the plurality of circuit modules.

8. The intercom system of claim 6, wherein a failure of any one of the plurality of circuit modules will not interfere with the remainder of the plurality of circuit modules.

9. The intercom system of claim 6, wherein each circuit module comprises:
   a control data communications circuit for automatically and directly transferring variable-length block data onto the bus for transport between circuit modules.

10. The intercom system of claim 9, wherein the control data communications circuit includes a transmitter portion and a receiver portion.

11. The intercom system of claim 9, wherein each of the control data communications circuit includes a separate message receive buffer for each of a plurality of message sources in the intercom system.

12. The intercom system of claim 9, wherein each control data communications circuit is associated with a unique system address having a pre-selected time slot within the data frame associated with its address for transferring data onto the bus.

13. The system of claim 6, wherein at least one of the circuit modules comprises a configuration card providing system parameter configuration data to the bus, the configuration data being alterable through a user accessible computer; and
   a first plurality of the circuit modules comprising matrix cards, the matrix cards having alterable random access memory (RAM) capable of receiving configuration information across the bus from the configuration card in response to changes in either of system layout and function, the changes being desired by a system user and communicated to the system through the user accessible computer.

14. The intercom system of claim 13, wherein the matrix cards exchange the control message data in a manner independent of the configuration card.

15. The intercom system of claim 9, wherein each circuit module controls the relative audio signal volumes at its respective peripheral stations, each peripheral station having a volume control means for causing the circuit module to which it is connected to raise the relative volume of a selected audio signal source by reducing the volumes of other audio signal sources received by the peripheral station from the module to which the peripheral station is connected.

16. An intercom system for transferring audio information and data information among a plurality of users on a common, time-division-multiplexed parallel bus, the intercom system comprising:
- a plurality of circuit modules connected to the bus, each one of the circuit modules being connected to at least one peripheral station for control message and audio data interface between the peripheral stations and the bus;
- each circuit module having a control data communication circuit having a receiver and a transmitter, the transmitter having assigned transmit time slots for transferring control messages onto the bus, the transmitter being configured for transmitting, in successive time slots, data identifying a unique address, each receiver being configured for distinguishing the address data received on the bus during a designated receive time slot for automatically determining which of the circuit modules is a source of a control message datum; and
- wherein the transmitter of the control data communications circuit includes:
  - means for generating a uniquely addressed control message;
  - means for placing the uniquely addressed control message in a transmit buffer;
  - means for finding an appropriate time slot corresponding to a uniquely addressed destination circuit module within the integrated data frame for placing the uniquely addressed control message;
  - means for placing the uniquely addressed control message on the bus with a destination datum; and
- wherein the receiver of the control data communications circuit includes:
  - means for receiving the control messages on the bus and sorting from the control messages a plurality of simultaneous uniquely addressed control messages sent by other circuit modules, acting as source circuit modules, intended for the circuit module as a destination circuit module; and
  - means for accepting the sorted, uniquely addressed control messages into separate receiving buffers assigned to the corresponding source circuit modules.

17. A method of communicating across an intercom system, the method comprising:
- transporting data on a bus, the data comprising both control messages and audio data;
- processing the data on a plurality of data processing circuit modules in electrical communication with the bus, and within each circuit module, automatically and directly transferring variable-length block data onto the bus for transport between the circuit modules;
- transmitting and receiving the data to and from at least one peripheral station in communication with each of the circuit modules;
- transporting the data, comprising the control messages and audio data, by the bus within an integrated data frame.

18. A method of communicating across an intercom system, the method comprising:
- transporting data on a bus, the data comprising both control messages and audio data;
- processing the data on a plurality of data processing circuit modules in electrical communication with the bus, and within each circuit module, automatically and directly transferring variable-length block data onto the bus for transport between the circuit modules, wherein the processing step within each circuit module comprises:
  - receiving the control messages on the bus;
  - sorting from the control messages a first control message from a source circuit module and intended for the circuit module;
  - accepting the first control message into a receiving buffer assigned to the source circuit module; and
  - executing control commands within the first control message; and
- transmitting and receiving the data to and from at least one peripheral station in communication with each of the circuit modules;
- transporting the data, comprising the control messages and audio data, by the bus within an integrated data frame.

19. The method of claim 17, wherein the processing step at the source circuit module comprises:
- generating the first control message;
- placing the generated first control message in a transmit buffer;
- finding an appropriate time slot within the integrated data frame for placing the first generated control message on the bus;
- placing the generated first control message on the bus with a destination datum within the appropriate time slot within the integrated data frame.

20. An intercom system for transferring digital audio and control data signals among a plurality of users on a common, time-division-multiplexed parallel data bus, the intercom system comprising:
- a plurality of matrix cards connected to the bus, each matrix card having at least one intercom station connected to it for audio and control data interface between the intercom station and the bus;
- each of the matrix cards having a control data communications circuit for automatically and directly transferring variable-length block data on the bus between matrix cards;
- each control data communications circuit having both a transmitter and a receiver portion and a separate message receive buffer for each of a plurality of message sources in the intercom system;
- each control data communications circuit being associated with a unique system address having a pre-selected time slot associated with its address for transferring data onto the bus.

21. An intercom system for transferring audio information and data information among a plurality of users on a common, time-division-multiplexed (TDM) parallel bus, the intercom system comprising:
- a plurality of matrix cards connected to the bus, each matrix card having at least one intercom station connected to it for audio data interface between the stations and the bus;
- each matrix card being capable of acting as both a transmitter and a receiver and having a microprocessor, a random access memory (RAM) which includes a transmit buffer and a receive buffer, a source register, and a destination register,
  - wherein the microprocessor of a matrix card acting as a transmitter loads a variable-length message into the transmit buffer, loads the source register with the size of the message, and immediately sends both the message and the message size information across the TDM bus to one or more uniquely addressed matrix cards acting as receivers, and wherein each microprocessor of the one or more uniquely addressed matrix cards acting as a receiver receives the size information and the message via the TDM bus, loads a receive buffer specific to the matrix card acting as the source with the message, and when that receive buffer is full, identifies the size and source of the message.

22. An intercom system for transferring audio information and data information among a plurality of users on a common, time-division-multiplexed parallel bus, the intercom system comprising:

a plurality of matrix cards connected to the bus, each matrix card having at least one intercom station connected to it for audio and control data interface between the stations and the bus;

each matrix card having a control data communication circuit having a receiver and a transmitter, the transmitter having assigned transmit time slots for transferring data onto the bus, the transmitter being configured for transmitting, in successive the time slots, data identifying a unique address, each receiver being configured for distinguishing the address data received on the bus during a designated receive time slot for automatically determining which matrix cards are connected to the bus;

wherein the transmitter of the control data communications circuit includes:

means for generating a uniquely addressed control message;

means for placing the uniquely addressed control message in a transmit buffer;

means for finding an appropriate time slot corresponding to a uniquely addressed destination circuit module within the integrated data frame for placing the uniquely addressed control message;

means for placing the uniquely addressed control message on the bus with a destination datum; and wherein the receiver of the control data communications circuit includes:

means for receiving the control messages on the bus and sorting from the control messages a plurality of simultaneous uniquely addressed control messages sent by other circuit modules, acting as source circuit modules, intended for the circuit module as a destination circuit module; and means for accepting the sorted, uniquely addressed control messages into separate receiving buffers assigned to the corresponding source circuit modules.

* * * * *